(12) United States Patent
Matsuo et al.

(10) Patent No.: US 8,707,901 B2
(45) Date of Patent: Apr. 29, 2014

(54) SYSTEM TOILET FOR DOGS

(75) Inventors: Takayuki Matsuo, Kagawa (JP);
Tomoko Hirao, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 13/806,238

(22) PCT Filed: Jun. 23, 2011

(86) PCT No.: PCT/JP2011/064438
§ 371 (c)(1),
(2), (4) Date: Dec. 21, 2012

(87) PCT Pub. No.: WO2011/162347
PCT Pub. Date: Dec. 29, 2011

(65) Prior Publication Data
US 2013/0098300 A1    Apr. 25, 2013

(30) Foreign Application Priority Data

Jun. 25, 2010  (JP) .................................. 2010-145701

(51) Int. Cl.
*A01K 1/01*    (2006.01)

(52) U.S. Cl.
USPC .......................................... 119/166; 119/169

(58) Field of Classification Search
USPC ................. 119/166, 165, 167, 168, 169, 171
See application file for complete search history.

(56) References Cited

U.S. PATENT DOCUMENTS

| | | | | |
|---|---|---|---|---|
| 4,534,315 | A | * | 8/1985 | Sweeney ........................ 119/165 |
| 5,193,488 | A | * | 3/1993 | Walton ........................... 119/166 |
| 5,353,743 | A | * | 10/1994 | Walton ........................... 119/166 |
| 6,578,520 | B2 | * | 6/2003 | Otsuji et al. ................... 119/165 |
| 6,802,281 | B2 | * | 10/2004 | Otsuji et al. ................... 119/169 |
| 7,128,023 | B2 | * | 10/2006 | Otsuji et al. ................... 119/169 |
| 7,568,448 | B2 | * | 8/2009 | Yamamoto et al. ............ 119/166 |

(Continued)

FOREIGN PATENT DOCUMENTS

| | | |
|---|---|---|
| CN | 2010-029359 | 3/2008 |
| JP | 2002-142599 A | 5/2002 |

(Continued)

OTHER PUBLICATIONS

International Search Report based on corresponding PCT application No. PCT/JP2011/064438 dated Aug. 9, 2011 (2 pgs).
Chinese Office Action and English translation issued in corresponding Chinese Application No. 201180030588A.1 mailed Nov. 22, 2013 (12 pgs).

*Primary Examiner* — Yvonne Abbott
(74) *Attorney, Agent, or Firm* — Brinks Gilson & Lione

(57) ABSTRACT

Disclosed is a system toilet for dogs that can reduce wetting of dog feet and that dogs can appropriately use for excretion. The system toilet for dogs is provided with: an excretion receptacle having an excrement containing section that can contain excrement and at which an absorbent sheet can be disposed; and a water-absorbent, disposable, liquid-permeable panel that is disposed in a manner so as to cover the top of the excrement containing section. The thickness of the liquid-permeable panel is 3-25 mm, and the height from the bottom end of the excretion receptacle to the top surface of the liquid-permeable panel is no greater than 65 mm. Also, the system toilet for dogs is further provided with a support section that is disposed between the excrement containing section and the liquid-permeable panel, and that supports the liquid-permeable panel.

6 Claims, 8 Drawing Sheets

(56) References Cited

U.S. PATENT DOCUMENTS

| | | | |
|---|---|---|---|
| 8,113,146 B2 * | 2/2012 | Askinasi | 119/169 |
| 8,327,801 B1 * | 12/2012 | Tierney | 119/165 |
| 8,360,006 B2 * | 1/2013 | Lechaton et al. | 119/161 |
| 2003/0150393 A1 | 8/2003 | Otsuji et al. | |

FOREIGN PATENT DOCUMENTS

| | | |
|---|---|---|
| JP | 2003-235389 A | 8/2003 |
| JP | 2006-000044 A | 1/2006 |
| JP | 2006-238780 A | 9/2006 |
| JP | 2007-202570 A | 8/2007 |

* cited by examiner

FIG. 7
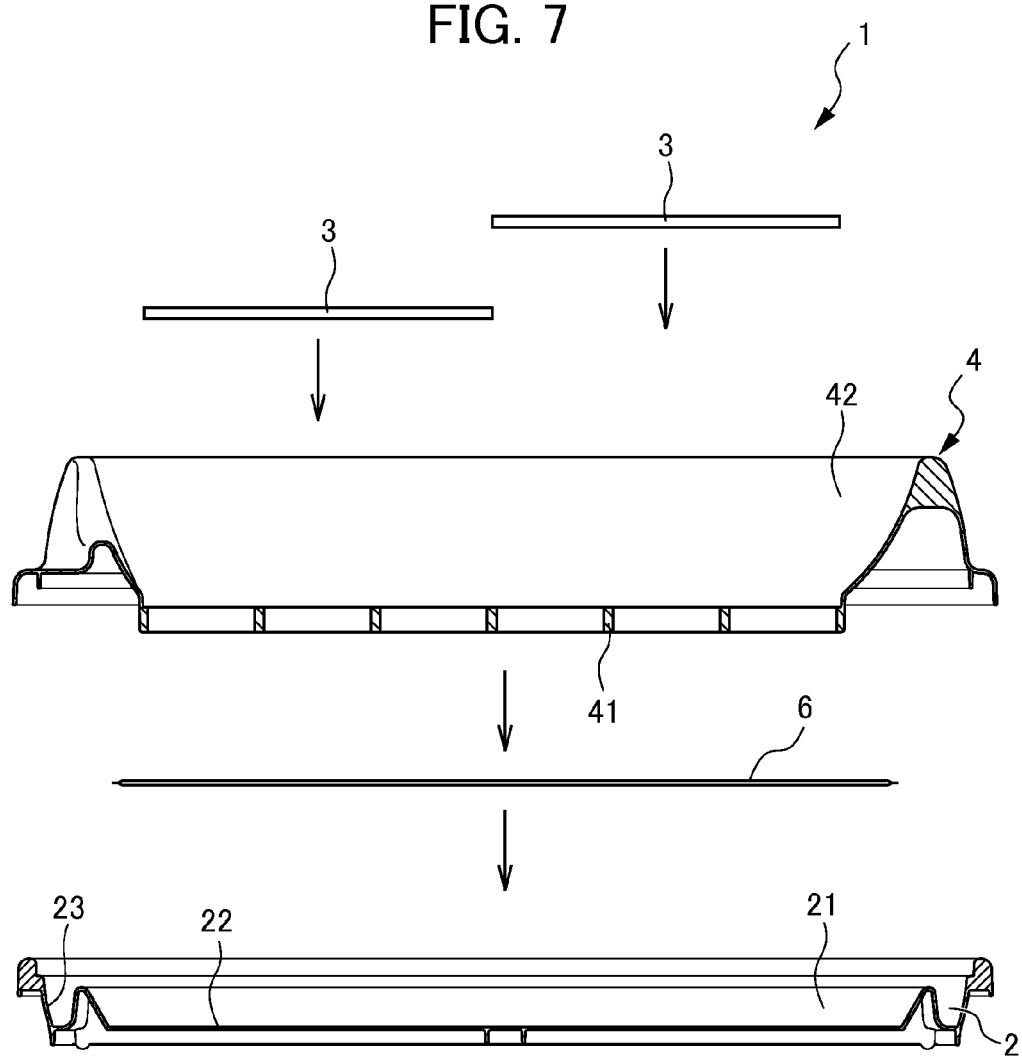
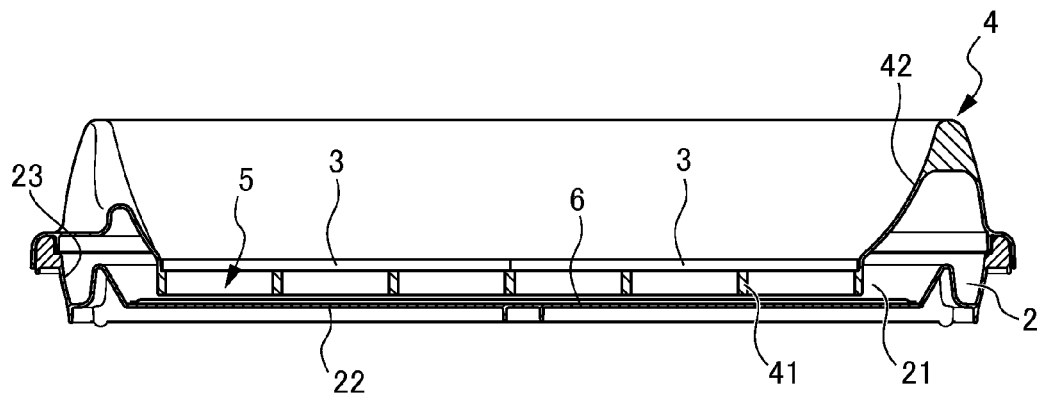

SYSTEM TOILET FOR DOGS

RELATED APPLICATION

This application is a 35 U.S.C. §371 national phase filing of International Patent Application No. PCT/JP2011/064438 filed Jun. 23, 2011, to which priority is claimed under 35 U.S.C. §120 and through which priority is claimed under 35 U.S.C. §119 to Japanese Patent Application No. 2010-145701, filed Jun. 25, 2010.

TECHNICAL FIELD

The present invention relates to a system toilet for dogs.

BACKGROUND ART

A toilet for an animal which can be disposed in a room is used in order to manage excrement of the animal that inhabits the room. As this type of toilet for an animal, a toilet for an animal that has a urine-absorbent mat which is water-absorbent and a liquid-permeable non-woven fabric configured to cover the upper surface of the urine-absorbent mat, which are disposed in a pan as an excretion receptacle has been proposed (reference is made to Patent Document 1).

However, in the toilet for an animal disclosed in Patent Document 1, the animal performs excretion by directly mounting onto the non-woven fabric. Consequently, the feet of the animal may be wetted as a result of the animal standing in the excrement stain or as a result of the feet of the animal making contact with the urine that disperses on the upper surface of the non-woven fabric after excretion. When the feet are wetted, the floor surface in the room becomes contaminated as a result of the animal moving in the room after excretion. As a result, there is a strong demand for an animal toilet that inhibits wetting of the animal feet during excretion.

A system toilet for an animal has been proposed in which the problem of wetting of the feet of the animal is improved by filling the excretion receptacle with a moisture-absorbent material, such as cat sand, that absorbs excrement and providing a lattice-shaped base frame with a suitable space on an upper section of the moisture-absorbent material (reference is made to Patent Document 2).

However, the base frame of the system toilet for an animal proposed in Patent Document 2 is not liquid absorbing, and therefore the feet of the animal continue to be wetted by the small amount of urine that is attached to the base frame. Consequently, there is a need to further enhance the moisture-absorbent and liquid-permeable characteristics of the surface with which the feet of the animal make contact in the system toilet for an animal.

The system toilet for an animal such as that proposed by Patent Document 2 disposes a lattice-shaped base frame on the upper section of the excretion receptacle that contains the moisture-absorbent material. Consequently, the position at which excretion is performed by the animal is elevated by a predetermined height from the floor surface on which the system toilet for an animal is disposed. When the kept animal is a cat, that is to say, when the system toilet for an animal is applied to a cat, since the cat does not tend to discriminate in relation to a difference in the height between the excretion position and the floor surface, there is no problem when the excretion position (height of the system toilet for an animal) is elevated.

However, when the system toilet for an animal is applied to a dog, the dog is sensitive to the difference in the height between the floor surface and the excretion position. Consequently, when the height of the excretion position in the system toilet for an animal is elevated, there is the problem the dog is resistant to excreting in the system toilet for an animal.

Patent Document 1: Japanese Unexamined Patent Application, Publication No. 2002-142599

Patent Document 2: Japanese Unexamined Patent Application, Publication No. 2003-235389

DISCLOSURE OF THE INVENTION

Problems to be Solved by the Invention

Therefore, the present invention has an object of providing a system toilet for dogs that enables suitable excretion by the dog and inhibits wetting of the feet of the dog.

Means for Solving the Problems

The present invention relates to a system toilet for dogs including an excretion receptacle containable excrement and having an excrement containing section at which an absorbent sheet can be disposed; and a water-absorbent, disposable and liquid-permeable panel that is disposed in a manner so as to cover a top of the excrement containing section. A thickness of the liquid-permeable panel is 3-25 mm, and a height from a bottom end of the excretion receptacle to a top surface of the liquid-permeable panel is no greater than 65 mm.

It is preferred that the system toilet for dogs further includes a support section that is disposed between the excrement containing section and the liquid-permeable panel, and is configured to support the liquid-permeable panel.

It is preferred that the support section is configured from a plate member including a plurality of through holes, and is configured to support substantially a whole area of a lower surface of the liquid-permeable panel.

It is preferred that a height from a bottom surface section of the excretion receptacle to a lower surface of the liquid-permeable panel is 3 to 40 mm.

It is preferred that a thickness of the support section is 1 to 15 mm.

It is preferred that a space is formed between an upper surface of the absorbent sheet and the liquid-permeable panel when the absorbent sheet is disposed in the excrement containing section.

It is preferred that an upper surface of the absorbent sheet is separated from a lower surface of the liquid-permeable panel, and a separation length between the upper surface of the absorbent sheet and the lower surface of the liquid-permeable panel is no more than 37 mm.

Effects of the Invention

The system toilet for dogs according to the present invention inhibits wetting of the feet of the dog and enables suitable excretion by the dog.

BRIEF DESCRIPTION OF THE DRAWINGS

FIG. 7 is a sectional view illustrating the dismantled configuration of the system toilet for dogs illustrated in FIG. 1.

PREFERRED MODE FOR CARRYING OUT THE INVENTION

The preferred aspects of a system toilet for dogs according to the present invention will be described making reference to the figures.

Figure 1:
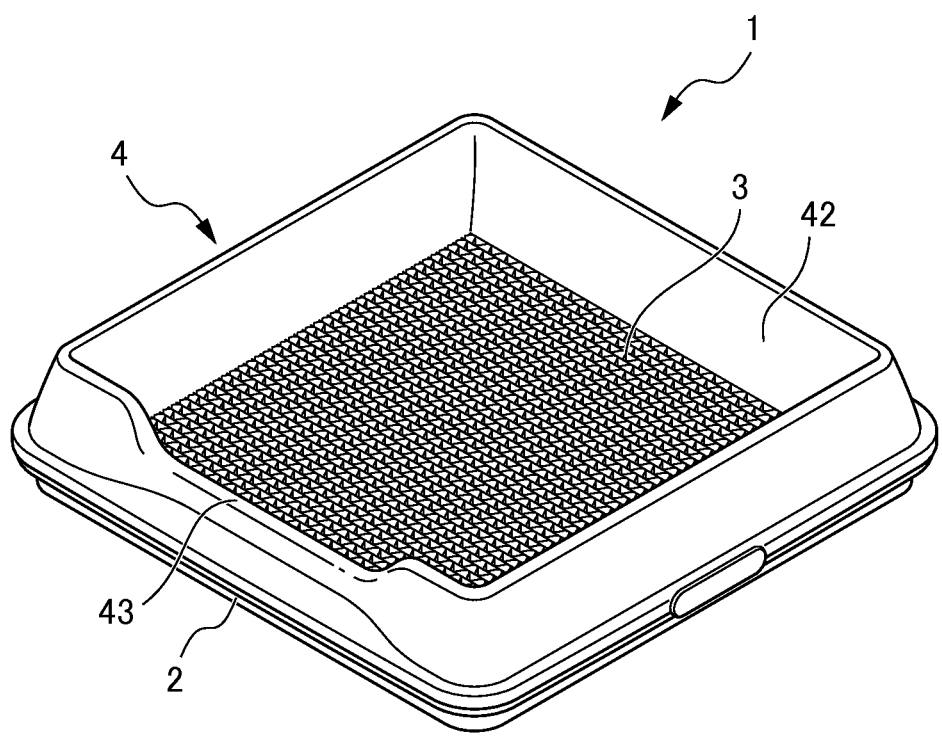
FIG. 1 is a perspective view illustrating a system toilet for dogs according to a first embodiment.
Figure 2:
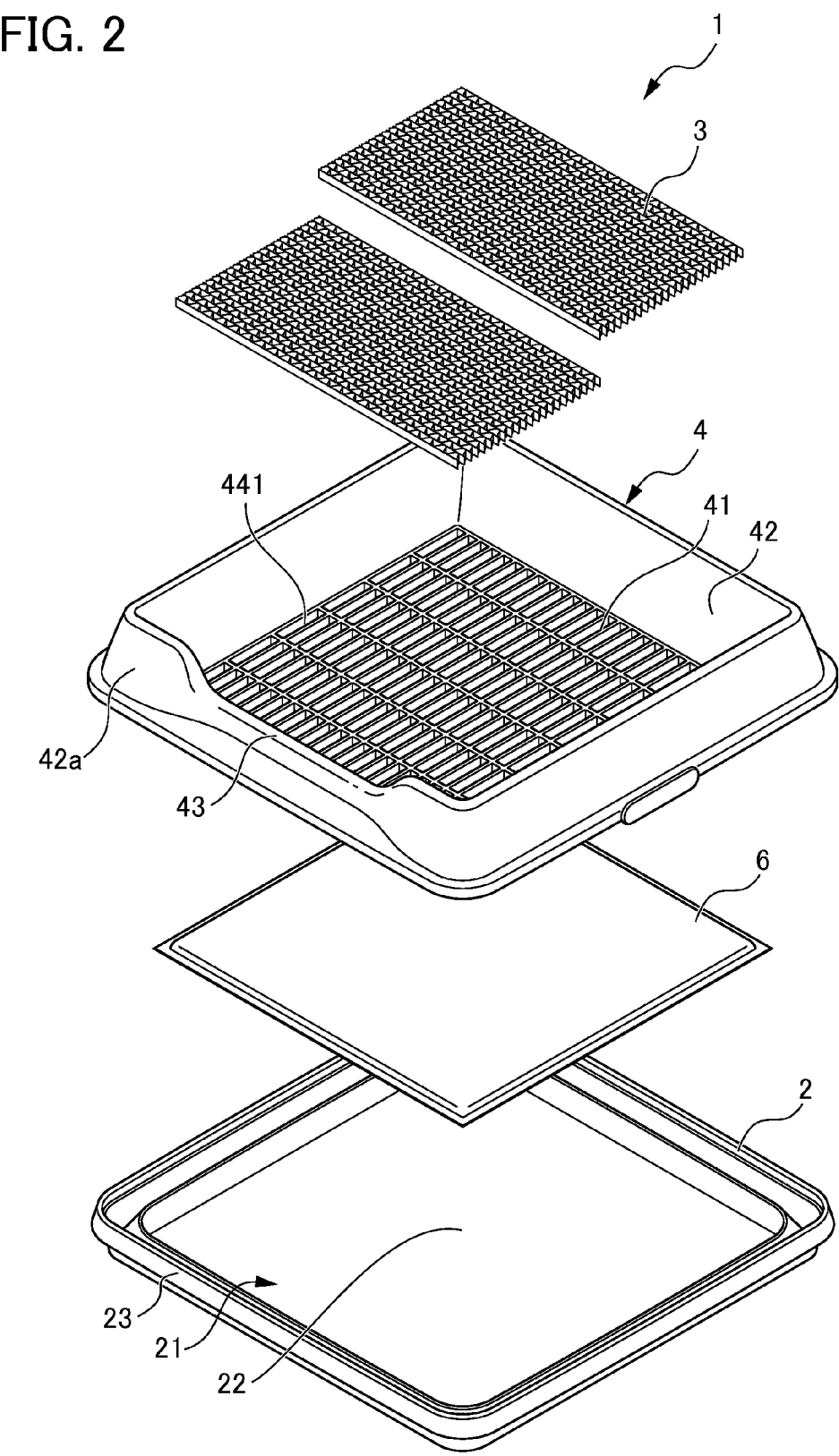
FIG. 2 is an exploded perspective view illustrating the system toilet for dogs illustrated in FIG. 1.
Figure 3:
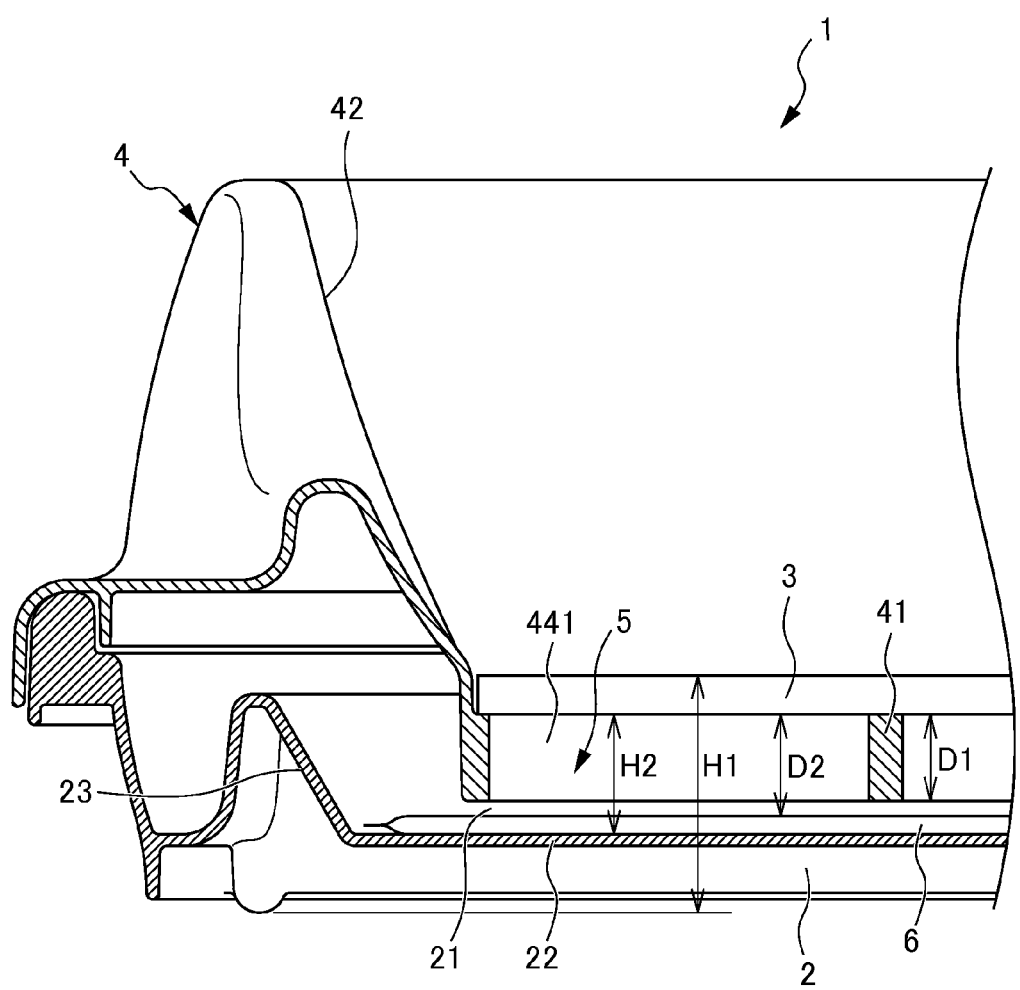
FIG. 3 is a partially enlarged sectional view illustrating the system toilet for dogs illustrated in FIG. 1.
Figure 4:
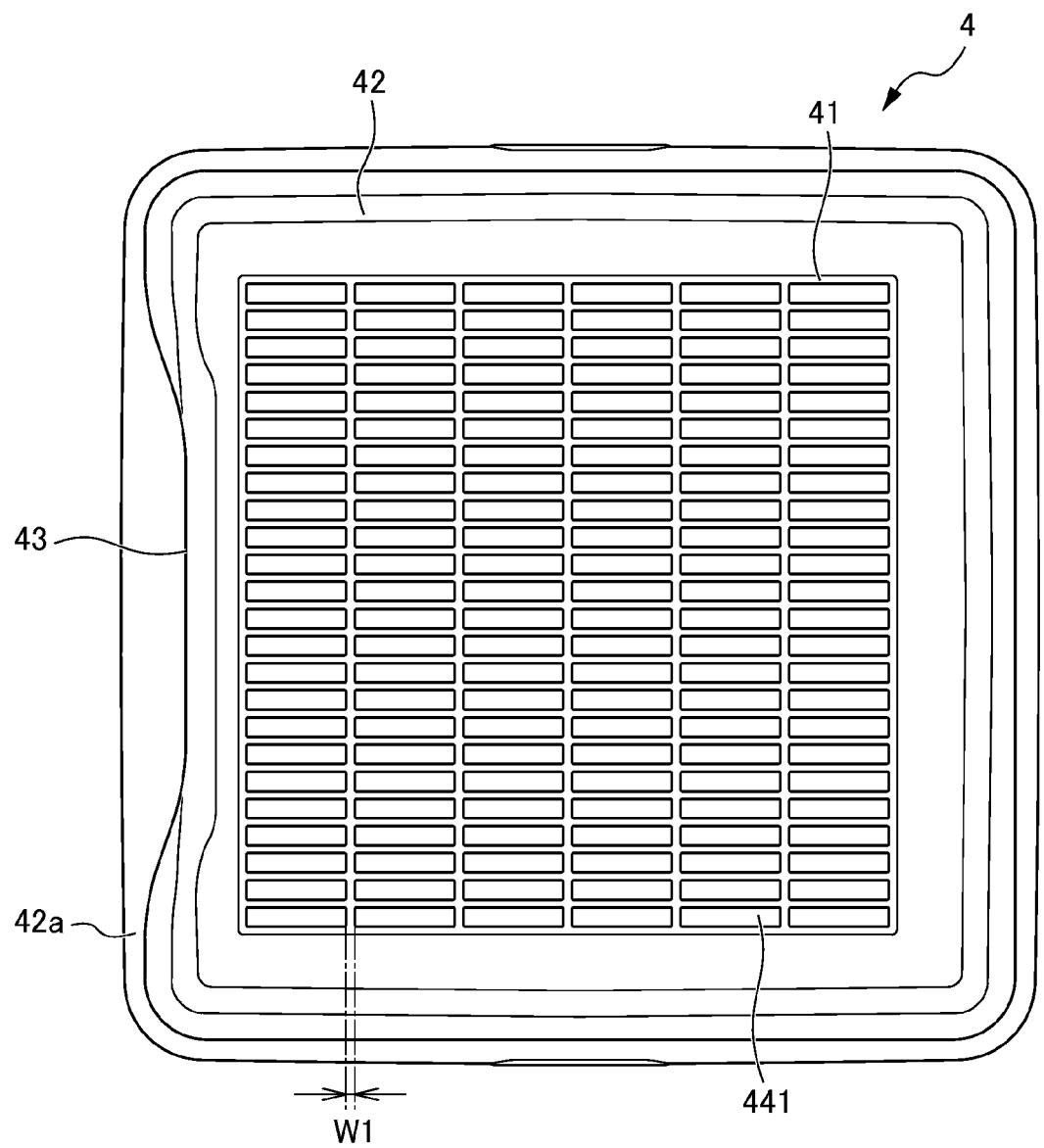
FIG. 4 is a plan view of the system toilet for dogs illustrated in FIG. 1, and illustrates the state with a liquid-permeable panel removed.

FIG. 1 is a perspective view illustrating a system toilet 1 for dogs according to a first embodiment. FIG. 2 is an exploded perspective view. FIG. 3 is a partially enlarged sectional view illustrating the system toilet 1 for dogs. FIG. 4 is a plan view of the system toilet 1 for dogs, and illustrates the state with a liquid-permeable panel removed.

As illustrated in FIG. 1 and FIG. 2, the system toilet 1 for dogs according to the first embodiment includes an excretion receptacle 2 that opens at a upper surface and that has an excrement containing section 21 at which an absorbent sheet 6 can be disposed; an upper receptacle 4 that is disposed on an upper section of the excretion receptacle 2 to cover the open upper surface of the excretion receptacle 2; and a liquid-permeable panel 3 that is mounted on a support section 41 that configures the bottom surface of the upper receptacle 4.

The term "dog" as used in the present specification mainly denotes a dog that is kept indoors, and more particularly, denotes a small dog generally having a weight of no greater than 7 kg.

As illustrated in FIG. 2 and FIG. 3, the excretion receptacle 2 includes a substantially square bottom surface section 22 and four side wall sections 23 that rise with a predetermined rise angle with respect to the bottom surface section 22 from the four sides of the bottom surface section 22. The excrement containing section 21 is formed from the space enclosed by the bottom surface section 22 and the four side wall sections 23. An absorbent sheet 6 is disposed in the excrement containing section 21 and absorbs urine and the like that is excreted by a dog.

As illustrated in FIG. 2, the upper receptacle 4 includes a support section 41 configured with an open upper surface and formed with a substantially square bottom surface when viewed in plan, and four upper side wall sections 42 that rise with a predetermined rise angle with respect to the support section 41 from the four sides of the support section 41.

As illustrated in FIG. 2 and FIG. 3, the support section 41 is disposed between the excrement containing section 21 and the liquid-permeable panel 3, and supports substantially the whole area of the lower surface of the liquid-permeable panel 3.

As illustrated in FIG. 4, the support section 41 is configured by a lattice-shaped plate member that includes a plurality of through holes 441, and exhibits permeable characteristics in relation to a liquid such as urine. That is to say, the plurality of through holes 441 is formed in a rectangular shape, and is disposed respectively with a predetermined interval in relation to the directions of the rows and lines.

The dimension of the plurality of through holes 441 preferably has a length on one side of 1 mm to 100 mm and more preferably 10 mm to 60 mm in light of maintaining suitable liquid permeable characteristics.

In the present embodiment, the shape of the through holes 441 is formed to be an oblong having a length of 55 mm and a width of 15 mm in light of maintaining suitable liquid permeable characteristics and maintaining the strength of the support section 41. The through holes 441 are disposed along a direction in which the longitudinal direction is oriented inwardly from the gateway part 43 described below in the upper receptacle 4.

The width W1 of the lattice-shaped section in the support section 41 (the thickness of the lattice crosspieces) is preferably 1 mm to 10 mm, and more preferably 2 mm to 6 mm in order to maintain suitable liquid permeable characteristics and maintain the strength of the support section 41.

The thickness D1 of the support section 41 is preferably 1 mm to 15 mm in order to maintain the strength of the support section 41 and to prevent a liquid such as urine that is contained in the excrement containing section 21 from returning to the liquid-permeable panel 3.

The height of the three upper side wall sections 42 of the four upper side wall sections 42 is configured to be substantially equal. A gateway part 43 is formed on one of the upper side wall sections 42a of the four upper side wall sections 42 and is configured with a height that is less than the height of the other three upper side wall sections 42. A dog that uses the system toilet 1 for dogs may enter and leave the upper receptacle 4 from the gateway part 43.

The excretion receptacle 2 and the upper receptacle 4 may be configured by use of various materials such as woods, metals, or plastics. Of such materials, the use of a plastic is preferred in light of the problem of the production of an offensive smell resulting from seepage of excrement into the inner portion of the material, or the problem of corrosion due to excrement. The plastic may include use of a material such as polyethylene, polypropylene, vinyl chloride resin, polystyrene, an ABS resin, an AS resin, polyester resin (polyethylene terephthalate and the like), a polyamide resin, and a polycarbonate resin and the like.

Figure 5:
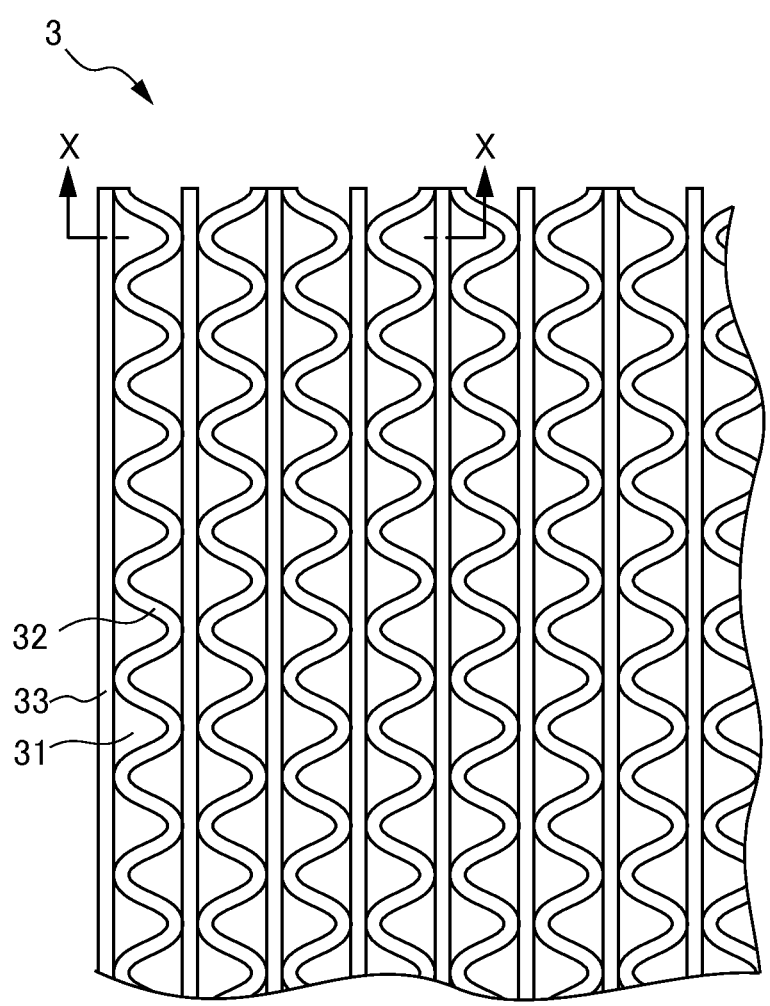
FIG. 5 is an enlarged plan view of the liquid-permeable panel.
Figure 6:
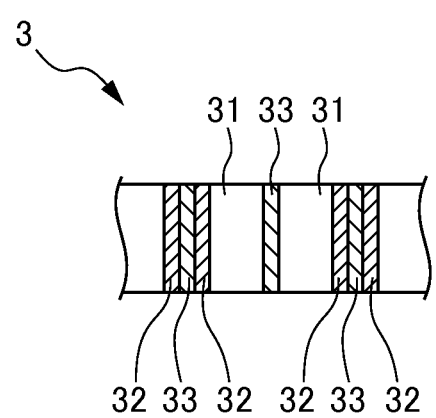
FIG. 6 is a sectional view along the line X-X in FIG. 5.

FIG. 5 is a plan view of the liquid-permeable panel 3. FIG. 6 is a sectional view along the line X-X in FIG. 5.

As illustrated in FIG. 1 and FIG. 2, the liquid-permeable panel 3 is disposed to cover the upper section of the excrement containing section 21 and is configured from a disposable panel that is liquid-absorbent. The liquid-permeable panel 3 is disposed on the upper surface side of the support section 41 of the upper receptacle 4 and covers substantially the whole region on the upper surface of the support section 41.

In the present embodiment, as illustrated in FIG. 2, the liquid-permeable panel 3 is formed in a rectangular shape that is approximately half of the size of the support section 41. The upper surface of the support section 41 is covered by two liquid-permeable panels 3. The longitudinal direction of the liquid-permeable panel 3 is disposed along the direction of extension of the upper side wall section 42a forming the gateway port 43 of the upper receptacle 4. The liquid-permeable panel 3 described above includes predetermined liquid permeable characteristics, liquid absorption characteristics, and deodorizing characteristics.

As illustrated in FIG. 5 and FIG. 6, the liquid-permeable panel 3 includes a plurality of holes 31 penetrating through the direction of thickness. The liquid-permeable panel 3 enables passage of excrement through the plurality of holes 31 in the thickness direction of the liquid-permeable panel 3. The shape and the surface area of the openings of the plurality of holes 31 may be the same or different. In comparison to a panel that is provided with holes that extend in an irregular direction such as a sponge material, the liquid-permeable panel 3 that includes the plurality of holes 31 for example reduces the amount of residual excrement in the inner portion of the disposable liquid-permeable panel 3 and suppress wetting of the feet of the dog when the dog stands on the liquid-permeable panel 3.

When the liquid-permeable panel 3 includes a plurality of holes 31 penetrating through the thickness direction of the liquid-permeable panel 3, the average surface area of the openings of the plurality of holes 31 is preferably 10 mm$^2$/hole to 100 mm$^2$/hole, and more preferably 15 mm$^2$/hole to 60 mm$^2$/hole. When the average surface area of the openings of the plurality of holes 31 is excessively small, the amount of excrement that attaches to the liquid-permeable panel 3 increases and suppression of wetting of the feet of the dog becomes difficult. An excessively large average surface area of the openings of the plurality of holes 31 is not preferred since there is a need to increase the thickness of the liquid-permeable panel 3 to impart sufficient strength to the liquid-permeable panel 3. There is no particular limitation in relation to the measurement method of the average surface area of the openings of the plurality of holes 31, and various known methods may be used. For example, measurement can be performed using a method of image analysis of a photograph of the openings.

When the liquid-permeable panel 3 includes a plurality of holes 31 penetrating through the thickness direction, a preferred structure for the panel includes a honeycomb structure or a corrugated honeycomb structure. A panel with a corrugated honeycomb structure is still more preferred as a configuration of a panel in light of facilitating manufacture and cost effectiveness.

A liquid-permeable panel 3 having a corrugated honeycomb structure includes a laminated corrugated board having a size of holes 31 (cells) of 5 mm and a thickness of 5 mm. The panel material may be exemplified by a panel in which a COBB$_{30}$ method (JIS-P8140) is used to form a water resistant base paper exhibiting absorption characteristics of 10 g/m$^2$ to 20 g/m$^2$. The corrugated honeycomb panel exhibiting absorption characteristics within the above absorption range preferably is also imparted with strength when wet and delayed water-absorbent characteristics. Since the liquid-permeable panel 3 has a plurality of holes 31 penetrating through the thickness direction thereof, urine passes below the plurality the holes 31 and does not tend to expand on the surface of the liquid-permeable panel 3 on which the dog has mounted.

The liquid-permeable panel 3 having a corrugated honeycomb structure will be described below in detail. The liquid-permeable panel 3 having a corrugated honeycomb structure is manufactured in the following sequence.

Firstly, a corrugated sheet 32 and a flat sheet 33 are bonded to thereby obtain a one-sided corrugated board member. Then, a plurality of the resulting one-sided corrugated board members is laminated, and the members in adjacent layers are bonded. In this manner, a block-shaped member forming a plurality of holes 31 is obtained, and the holes 31 are formed by the space enclosed by the corrugated sheet 32 and the flat sheet 33.

Next, the resulting block-shaped members are sliced to a predetermined thickness in a direction that is substantially vertical to the direction of the penetrating of the holes 31. In this manner, the liquid-permeable panel 3 having a corrugated honeycomb structure forming the plurality of holes 31 can be manufactured.

There is no particular limitation on the method of bonding the corrugated sheet 32 and the flat sheet 33, and suitable selection may be made from various bonding methods such as a bonding method that uses adhesive. The adhesive used to bond the corrugated sheet 32 and the flat sheet 33 includes for example a vinyl acetate water resistant adhesive. The vinyl acetate water resistant adhesive preferably imparts strength to the panel when wet.

The above liquid-permeable panel 3 is disposed so that the longitudinal direction of the liquid-permeable panel 3 extends along the direction in which the short side of the lattice of the support section 41 continues. That is to say, the direction of extension of the longitudinal direction of the crosspieces of the lattice of the support section 41 and the direction of extension of the corrugated sheet 32 and the flat sheet 33 in the inner portion of the liquid-permeable panel 3 exhibit an intersecting configuration (substantially orthogonal). In this configuration, the crosspieces in the longitudinal direction of the lattice of the support section 41 are reinforced by the corrugated sheet 32 and the flat sheet 33 that configure the liquid-permeable panel 3, and the thickness of the support section 41 can be reduced due to the synergistic increase in the strength of system toilet for dogs 1 by the liquid-permeable panel 3 and the support section 41.

Various materials can be used without limitation as long as the material of the panel that exhibits liquid-absorbent characteristics and configures the liquid-permeable panel 3 allows enhanced passage of excrement and exhibits predetermined water absorption. An actual example of a material that has liquid-absorbent characteristics includes woody fiber such a pulp in addition to various organic or inorganic porous materials, or a woven or non-woven fabric configured from various organic or inorganic fibrous materials. An actual example of an organic fibrous material includes a cellulose fiber material such as a wood fiber (pulp or the like), cotton, hemp, or the like, an animal fiber such as animal hair or the like (wool, or the like), or a synthetic fiber such as a polyolefin fiber (polyethylene, polypropylene, or the like) a polyester fiber (polyethylene terephthalate, or the like), a nylon fiber (nylon 6, nylon 66, or the like), or an acrylic fiber or the like.

Of the above materials, from the point of view of facilitating processing operations and cost effectiveness, pulp is preferred, and a corrugated board paper that exhibits suitable liquid permeable characteristics and liquid-absorbent characteristics is more preferred. In this case, the corrugated board paper preferably contains a water repellent agent or a hydrophobic agent such as a sizing agent, and water-absorbent characteristics may be selected in response to the type and amount of the sizing agent.

The thickness of the liquid-permeable panel 3 described above is configured as 3 mm to 25 mm, preferably 3 mm to 10 mm, and still more preferably 3 mm to 7 mm. When the thickness of the liquid-permeable panel 3 is in the above range, a liquid such as urine or the like that passes in the thickness direction of the liquid-permeable panel 3 is inhibited from returning to the surface (upper surface) of the liquid-permeable panel 3.

When the thickness of the liquid-permeable panel 3 is less than 3 mm, passage of a liquid such as urine or the like into the excrement containing section 21 is prevented by deformation of the liquid-permeable panel 3, and there is a risk that the liquid-permeable panel 3 may be ruptured by the weight of the dog.

When the thickness of the liquid-permeable panel 3 exceeds 25 mm, the height from the lower end of the excretion receptacle 2 to the upper surface of the liquid-permeable panel 3 in the system toilet 1 for dogs is increased. Furthermore the absorption amount of excrement of the liquid-permeable panel 3 resulting from a single excretion is increased and thereby shortens the exchange cycle and bulkiness must be considered when storing the liquid-permeable panel 3 for replacement.

The liquid permeation rate of the liquid-permeable panel 3 is preferably at least 90% and still more preferably at least 93%. Use of the liquid-permeable panel 3 that has the above liquid permeation rate enables a reduction in the attachment of urine to the liquid-permeable panel 3 after excrement and inhibits production of wetting of the feet of the dog due to standing on the liquid-permeable panel 3 or dispersion of urine in the inner section of the liquid-permeable panel 3. The liquid permeation rate of the liquid-permeable panel 3 may be measured by the following method.

Method for Measurement of Liquid Permeation Rate

A tray configured in advance to measure a weight (A) is placed in a lower section of a test sample for measurement of the liquid permeation rate of the liquid-permeable panel 3. The weight of artificial urine (B) is measured by measurement of approximately 30 ml of artificial urine. A circular cylinder having an inner diameter 60 mm is placed on the sample and artificial urine is dripped uniformly onto an inner side of the circular cylinder. The weight (C) of the tray containing the artificial urine is measured upon stopping of the liquid drops of artificial urine from the sample. The value for the liquid permeation rate is calculated using the formula below. The artificial urine uses the following composition.

Composition of Artificial Urine

Urea 400 g

Sodium chloride 160 g

Magnesium sulfate (heptahydrate) 16 g

Calcium chloride (dihydrate) 6 g

Adjust above with water to make total of 20 L.

Add 2 g of Blue No. 1 to add color to adjusted liquid.

Formula for Calculation of Liquid Permeation Rate $$\text{Liquid Permeation Rate (\%)} = (\text{weight }(C) - \text{weight }(A)) \div \text{weight }(B) \times 100$$

The liquid-permeable panel 3 preferably has liquid-absorbent characteristics of 10%/min to 50%/min, and still more preferably 15%/min to 40%/min. Use of the liquid-permeable panel 3 with the above liquid-absorbent characteristics can suppress wetting of the feet of the dog, because the liquid-permeable panel 3 can absorb small amount of attached excrement after passage of a large amount of the excrement. When the water-absorbent characteristics of the liquid-permeable panel 3 are excessively large, during passage of the excrement, a large amount of excrement is absorbed by the liquid-permeable panel 3, and seepage of excrement resulting from the dog standing at the position at which excretion occurs on the liquid-permeable panel 3 tends to wet the feet of the dog. When the water-absorbent characteristics of the liquid-permeable panel 3 are excessively small, the attached excrement remains on the surface of the liquid-permeable panel 3 in a liquid state and therefore tends to wet the feet of the dog. The water-absorbent characteristics of the liquid-permeable panel 3 can be measured using the following method.

Method of Measuring Water-Absorbent Characteristics

The weight (A) of a test sample is measured in which a measurement object such as the liquid-permeable panel 3 is cut into 5 cm×5 cm. The cut test sample is immersed in artificial urine for one hour. After immersion for one hour, the sample is removed, artificial is urine attached to the surface is wiped off, and the weight (B) of each test sample is measured. The value of the liquid absorption characteristics is calculated based on the formula below. The artificial urine is the same as that used for measurement of the liquid permeation rate.

Formula for Calculation of Liquid-Absorbent Characteristics $$\text{Liquid-Absorbent Characteristics (\%/min)} = (\text{weight }(B) - \text{weight }(A)) \div \text{weight }(A) \times 100$$

FIG. 7 is an enlarged sectional view illustrating the system toilet 1 for dogs.

As illustrated in FIG. 7, the system toilet 1 for dogs as described above disposes an upper receptacle 4 on an upper section of the excretion receptacle 2 in a state in which the liquid-absorbent sheet 6 is contained in the excrement containing receptacle 21 and is used by mounting the liquid-permeable panel 3 on the support section 41 of the upper receptacle 4. As illustrated in FIG. 3, in this state, the support section 41 is disposed between the excrement containing section 21 and the liquid-permeable panel 3. Therefore, a predetermined space 5 is formed between the upper surface of the liquid-absorbent sheet 6 and the liquid-permeable panel 3.

In the system toilet 1 for dogs according to the present embodiment, the height H1 from the floor surface on which the system toilet 1 for dogs is disposed to the upper surface of the liquid-permeable panel 3, that is to say, the height H1 from the bottom end of the excretion receptacle 2 to the upper surface of the upper surface of the liquid-permeable panel 3 is no greater than 65 mm, preferably no greater than 50 mm, and more preferably no greater than 40 mm. When the height H1 from the bottom end of the excretion receptacle 2 to the upper surface of the upper surface of the liquid-permeable panel 3 is within the above range, a dog exhibits a tendency to become accustomed to the height of the system toilet 1 for dogs and to naturally perform excretion by using the system toilet 1 for dogs.

The height H2 from the bottom surface section 22 of the excretion receptacle 2 to the lower surface of the liquid-permeable panel 3 is preferably 3 mm to 40 mm and more preferably 15 mm to 30 mm from the point of view of inhibiting the height of the system toilet 1 for dogs and forming a suitable space 5 between the bottom surface of the liquid-permeable panel 3 and the absorbent sheet 6, when the absorbent sheet 6 is disposed. A suitable space 5 is formed by configuring a height H2 from the bottom surface section 22 of the excretion receptacle 2 to the lower surface of the support section 41, for example, when an absorbent sheet 6 having a thickness of substantially 3 to 20 mm is contained in the excrement containing section 21.

In the present embodiment, the upper surface of the absorbent sheet 6 contained in the excrement containing section 21 is separated from the lower surface of the liquid-permeable panel 3. The separation length D2 between the upper surface of the absorbent sheet 6 and the lower surface of the liquid-permeable panel 3 is preferably no more than 37 mm.

In the present specification, the term "bottom end" of the excretion receptacle 2 denotes the section on the outer surface side of the receptacle that makes contact with the floor of the room or the like when the excretion receptacle 2 is disposed indoors. The term "bottom surface section 22" of the excretion receptacle 2 denotes the bottom surface on the inner side of the excretion receptacle 2.

The following effects are obtained by the system toilet 1 for dogs as described above.

The system toilet 1 for dogs is provided with an excretion receptacle 2 having an excrement containing section 21 at which an absorbent sheet 6 can be disposed, and an absorbent, disposable and liquid-permeable panel 3 that is disposed in a manner so as to cover the top of the excrement containing section 21. The thickness of the liquid-permeable panel 3 is 3-25 mm, and the height from the bottom end of the excretion receptacle 2 to the top surface of the liquid-permeable panel 3 is no greater than 65 mm. In this manner, the majority of the liquid portion of the excrement excreted onto the top surface of the liquid-permeable panel 3 passes through the liquid-permeable panel 3 and is contained in the excrement containing section 21. The residual liquid in the liquid-permeable panel 3 is absorbed by the liquid-permeable panel 3. Since the strength of the liquid-permeable panel 3 is maintained and the liquid portion of excrement (urine) is inhibited from remaining on the liquid-permeable panel 3, the feet of the dog are inhibited from becoming wet.

Furthermore, even when the excretion receptacle 2 includes the liquid-permeable panel 3 and the excrement containing section 21, the height from the bottom end of the excretion receptacle 2 to the upper surface of the liquid-permeable panel 3 is no greater than 65 mm. In this manner, a dog can become accustomed to using the system toilet 1 for dogs and thereby the dog can perform suitable excretion.

A support section 41 is provided between the excrement containing section 21 and the liquid-permeable panel 3. In this manner, since the liquid-permeable panel 3 is supported by the support section 41, direct contact between the liquid-permeable panel 3 and the absorbent sheet 6 can be prevented. Therefore, even when a dog mounts onto the upper surface of the liquid-permeable panel 3, since liquid that has been absorbed by the absorbent sheet 6 does not undergo back flow, the feet of the dog are inhibited from becoming wet.

The support section 41 is configured from a lattice-shaped plate member and substantially the whole area of the lower surface of the liquid-permeable panel 3 is supported by the support section 41. In this manner, since the liquid-permeable panel 3 is disposed on the lattice-shaped plate member, the feet of the dog are inhibited from becoming wet by reason of excrement attached to the lattice-shaped plate member. Even when the absorbent sheet 6 swells by reason of absorbing liquid, the swollen absorbent sheet 6 is prevented from coming into contact with the liquid-permeable panel 3 by reason of the support section 41.

The height H2 from the bottom surface section 22 of the excrement containing section 21 to the lower surface of the liquid-permeable panel 3 is 3 to 40 mm. In this manner, the height of the system toilet 1 for dogs can be inhibited, and a suitable space 5 can be formed between the absorbent sheet 6 and the lower surface of the liquid-permeable panel 3 in a configuration in which the absorbent sheet 6 is disposed in the excrement containing section 21.

The upper surface of the absorbent sheet 6 is separated from the lower surface of the liquid-permeable panel 3 in a configuration in which the absorbent sheet 6 is disposed in the excrement containing section 21 and the separate distance D2 between the upper surface of the absorbent sheet 6 and the bottom surface of the liquid-permeable panel 3 is no greater than 37 mm. In this manner, even when the absorbent sheet 6 swells by absorbing liquid, the swollen absorbent sheet 6 is prevented from coming into contact with the liquid-permeable panel 3.

The thickness of the support section 41 is 1 to 15 mm. In this manner, the strength of the support section 41 can be maintained, and liquid such as urine that is contained in the excrement containing section 21 can be prevented from returning to the liquid-permeable panel 3.

The liquid-permeable panel 3 is detachably configured with respect to the support section 41. Therefore, even when the liquid-permeable panel 3 is soiled by absorption of urine or blockage with feces, the soiled liquid-permeable panel 3 can be simply exchanged and the cleaning operation for the system toilet 1 for dogs can be easily performed.

Although the present invention has been described making reference to the above embodiments, the present invention is not thereby limited to the above embodiments. The effects disclosed in the embodiments of the present invention are merely exemplary of the most preferred effects of the present invention, and the effects of the present invention are not thereby limited to those effects disclosed in the examples of the present invention.

For example, in the present embodiment, the excrement containing section 21 is formed by a space enclosed by the bottom surface section 22 of the excretion receptacle 2 and the four side wall sections 23. However, the excrement containing section may be configured as a retractable tray that can be drawn in a direction that is parallel to the lower section of the excretion receptacle 2.

EXAMPLES

Although the present invention is described in detail hereafter making reference to the examples, the present invention is not thereby limited to the examples.

Examples

An experiment was conducted over 14 days in accordance with the method described below in order to measure the habituation rate in relation to the height of the system toilet 1 for dogs using a group of 60 small dogs having a weight of no greater than 7 kg.

The small dogs were kept in advance indoors, and were accustomed to performing excretion on the liquid-permeable panel 3 in a predetermined place.

The measurement of the habituation rate is performed in relation to a height from the floor surface to the upper surface of the liquid-permeable panel 3 of 10 mm, 37 mm, 75 mm and 125 mm.

An absorbent sheet having a thickness of 5 mm was laid on the floor surface, and the height from the floor surface to the upper surface of the liquid-permeable panel 3 when the liquid-permeable panel 3 is disposed is 10 mm. The height from the bottom end of the excretion receptacle 2 to the upper surface of the liquid-permeable panel 3 when using the system toilet 1 for dogs according to the present embodiment is 37 mm. The height of 75 mm and 125 mm from the floor surface to the upper surface of the liquid-permeable panel 3 is configured by respectively disposing a platform having respective heights of 38 mm and 88 mm on the lower section of the excretion receptacle of the system toilet 1 for dogs that has a height of 37 mm from the bottom end of the excretion receptacle 2 to the upper surface of the liquid-permeable panel 3.

After disposing the absorbent sheet having a thickness of 5 mm on the floor surface and disposing the liquid-permeable panel 3 thereon, or after setting a system toilet 1 for dogs that includes the liquid-permeable panel 3, a dog was taken to be accustomed to the height of the system toilet 1 for dogs when a small dog excreted naturally in the system toilet 1 for dogs during a 24 hour period. In the event of a failure to excrete during the 24 hour period, and when excretion occurred in the periphery of the system toilet 1 for dogs or in another location during the 24 hour period, the dog was taken not to be accustomed to the height of the system toilet 1 for dogs.

The materials used in the experiment were as follows.

System toilet for dogs: polypropylene manufacture. Height of 32 mm from the bottom end of the excretion receptacle 2 to the upper surface of the support section 41.

Liquid-permeable panel 3: An A-flute single-sided cardboard is formed from ONBS water-resistant base paper commercially available from Oji Itagami Co., Ltd. (basis weight 180 g/m$^2$) and then is laminated and cut, and processed into a corrugated honeycomb configuration. Average surface area of hole openings 16 mm$^2$/unit. Thickness 5 mm.

Figure 8:
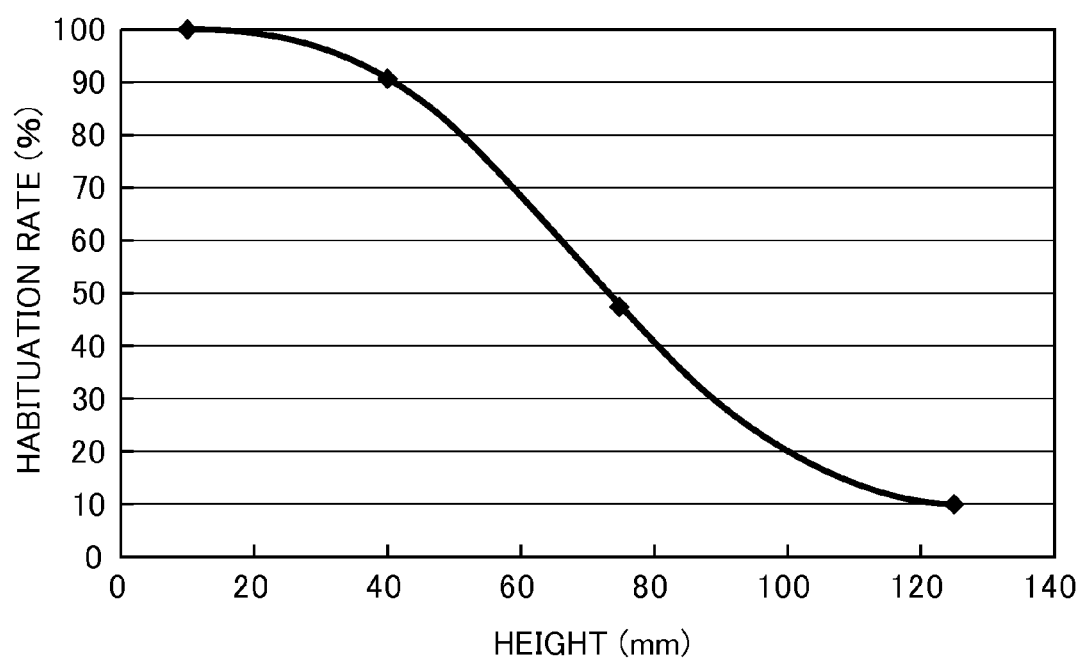
FIG. 8 illustrates the relationship between the height of the system toilet for dogs and the habituation rate.

Experimental results are shown in FIG. 8.

Evaluation

A height that facilitates habituation by a dog is evaluated on the basis of natural excretion by 36 dogs of the 60 dogs, that is to say, 60%.

As illustrated in FIG. 8, the habituation rate when the height from the floor surface to the upper surface of the liquid-permeable panel 3 is 10 mm was 100%. The habituation rate when the height from the floor surface to the upper surface of the liquid-permeable panel 3 is 37 mm was 91%. The habituation rate when the height from the floor surface to the upper surface of the liquid-permeable panel 3 is 75 mm was 47%. The habituation rate when the height from the floor surface to the upper surface of the liquid-permeable panel 3 is 125 mm was 10%.

It has been confirmed that when the height from the floor surface to the upper surface of the liquid-permeable panel 3 is no more than 65 mm, the dog exhibits a tendency for habituation to the height of the system toilet for dogs, when no greater than 50 mm, such habituation is further facilitated, and when no greater than 40 mm, such habituation is extremely facilitated.

Conversely, it was confirmed that when the height from the floor surface to the upper surface of the liquid-permeable panel 3 exceeds 65 mm, the dog experiences difficulty in habituation to the height of the system toilet for dogs, and when exceeding 125 mm, the dogs accustomed to the height falls to 10%.

The invention claimed is:

1. A system toilet for dogs comprising:
   an excretion receptacle containable excrement and having an excrement containing section at which an absorbent sheet can be disposed;
   a water-absorbent, disposable and liquid-permeable panel that is disposed in a manner so as to cover a top of the excrement containing section, and
   a support section that is disposed between the excrement containing section and the liquid-permeable panel, and is configured to support the liquid-permeable panel, wherein
   a thickness of the liquid-permeable panel is 3-25 mm, and
   a height from a bottom end of the excretion receptacle to a top surface of the liquid-permeable panel is no greater than 65 mm.

2. The system toilet for dogs according to claim 1, wherein the support section is configured from a plate member including a plurality of through holes, and is configured to support substantially a whole area of a lower surface of the liquid-permeable panel.

3. The system toilet for dogs according to claim 1, wherein a height from a bottom surface section of the excretion receptacle to a lower surface of the liquid-permeable panel is 3 to 40 mm.

4. The system toilet for dogs according to claim 1, wherein a thickness of the support section is 1 to 15 mm.

5. The system toilet for dogs according to claim 1, wherein a space is formed between an upper surface of the absorbent sheet and the liquid-permeable panel when the absorbent sheet is disposed in the excrement containing section.

6. The system toilet for dogs according to claim 1, wherein an upper surface of the absorbent sheet is separated from a lower surface of the liquid-permeable panel, and a separation length between the upper surface of the absorbent sheet and the lower surface of the liquid-permeable panel is no greater than 37 mm.

* * * * *